United States Patent [19]
Ashton

[11] 3,977,164
[45] Aug. 31, 1976

[54] CENTER SUPPORT FOR COMBINE TABLE AUGER

[75] Inventor: Robert Ashton, Islington, Canada

[73] Assignee: Massey-Ferguson Industries Limited, Toronto, Canada

[22] Filed: Apr. 10, 1975

[21] Appl. No.: 566,846

[52] U.S. Cl.................................. 56/14.5; 198/217
[51] Int. Cl.².......................................... A01D 57/00
[58] Field of Search........................... 56/14.3–14.6, 56/192, 208, 219, 220, 221, DIG. 1; 198/213–217

[56] References Cited
UNITED STATES PATENTS 3,060,665   10/1963   Escher............................ 56/14.4 X
3,292,585   12/1966   Buschbom et al............. 198/213 X

FOREIGN PATENTS OR APPLICATIONS 6,515,523   5/1967   Netherlands........................ 56/14.5
6,402,194   9/1965   Netherlands........................ 56/14.4

Primary Examiner—J.N. Eskovitz
Attorney, Agent, or Firm—Robert L. Farris

[57] ABSTRACT

A crop gathering table for combine harvesters has a pair of auger tubes each supported on bearings at one end of the table and bolted together at the center. Supported on the fastening bolts are a plurality of anti-friction rollers lying between the adjacent ends of the augers. A circular track forms a support for the rollers and is self-supported from the main frame of the table.

5 Claims, 4 Drawing Figures

CENTER SUPPORT FOR COMBINE TABLE AUGER

As manufacturers build larger and larger combines, the design and construction of suitable combine tables becomes more difficult and reaches the point where conventional design is no longer adequate. One problem is that of auger design where a satisfactory compromise between rigidity, weight, and cost requirements becomes impossible to achieve with conventional design. It must have sufficient beam strength to prevent the auger flights from contacting the table bottom near the center or else the flights and the table will wear excessively. If the auger is designed with sufficient rigidity, using ordinary steel construction, the weight of the table as a whole is increased to the point where the machine in whole is "nose heavy" and the rear steering wheels engage the ground so lightly that steering becomes unreliable. If the necessary auger beam strength is achieved by the use of more exotic, light weight materials other than steel, then a serious cost penalty is incurred.

It is an object of the present invention to provide an improved auger construction for crop gathering tables by which the beam strength requirements are greatly reduced, resulting in a lighter weight construction without the use of costly materials.

A further object is to provide such a construction wherein two augers are joined rigidly together at the center of the table and a rigid rotary support is provided intermediate their joined ends.

These objects are achieved by the provision of a crop table and auger construction for combine harvesters which comprises a table having bottom and back walls and with end walls connecting them, an auger extending between and journalled on the end walls, a plurality of sets of retractable fingers at the mid-portion of the auger for propelling the crop off the table at the rear, and means centrally supporting the auger in spaced-relation to the table substantially mid-way between the end walls of the table.

IN THE DRAWINGS

Figure 1:
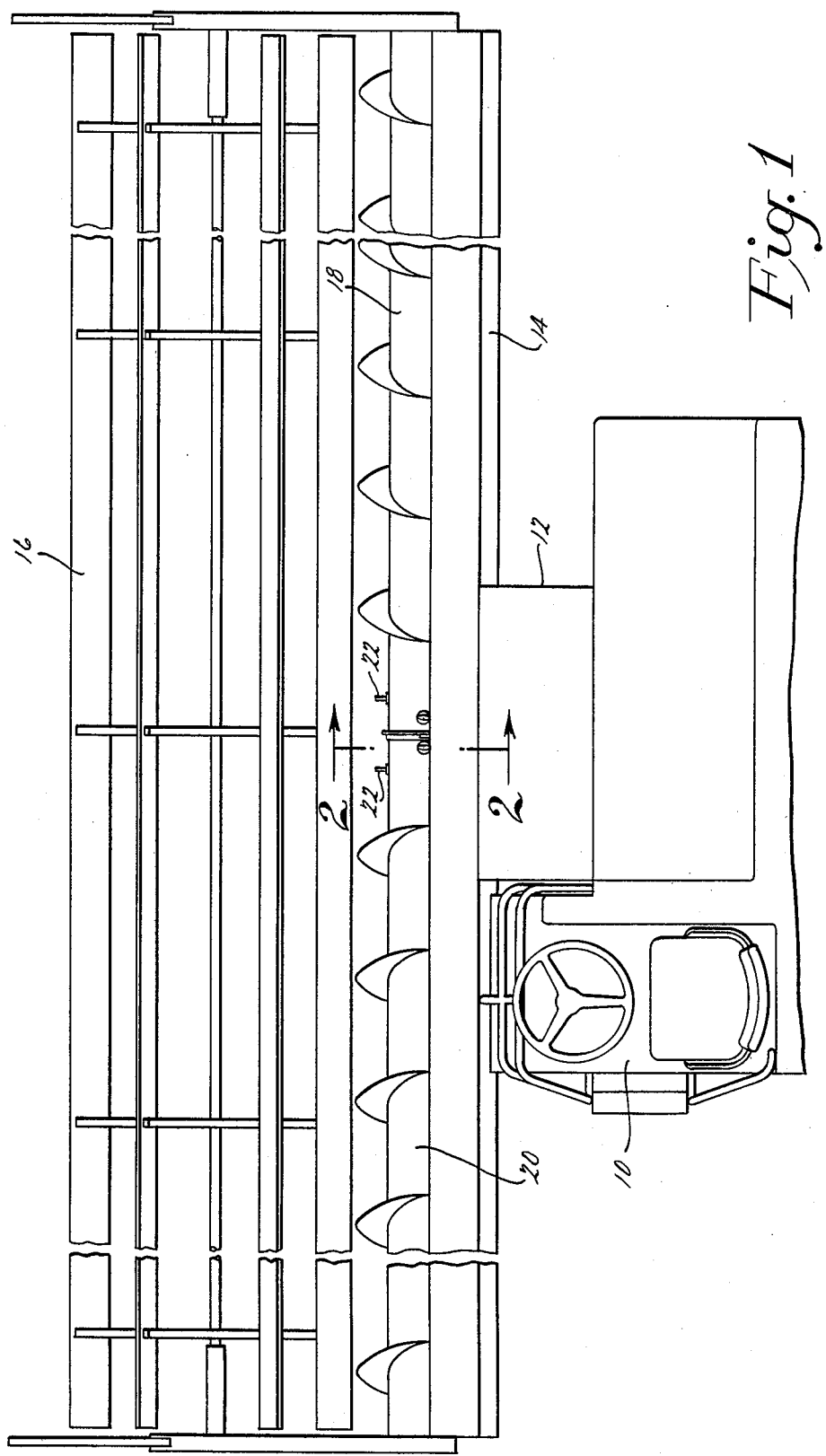
FIG. 1 is a fragmentary top view of a combine harvester incorporating a preferred form of the present invention.
Figure 2:
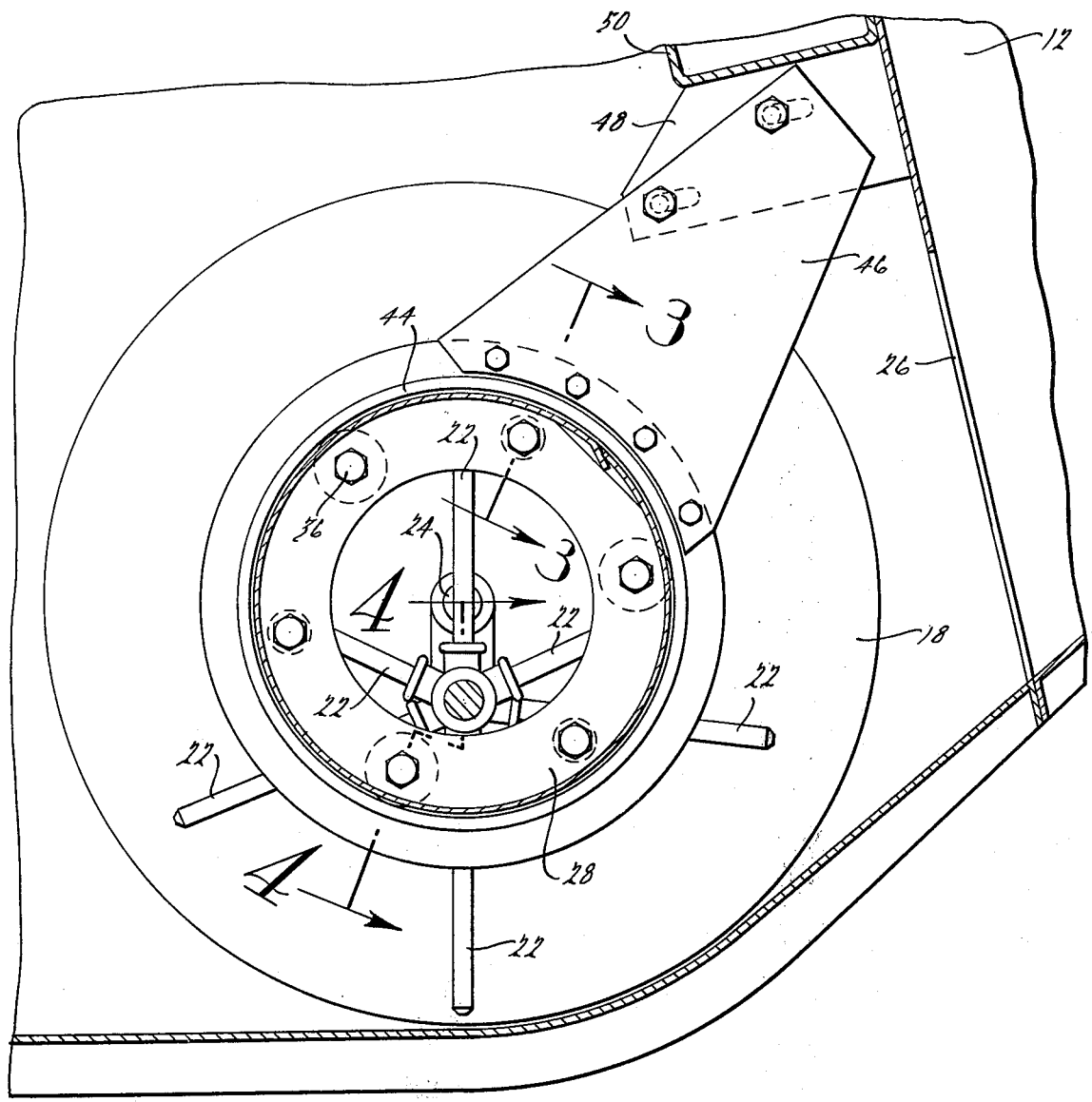
FIG. 2 is a cross-sectional view on line 2—2 of FIG. 1.

Referring to FIG. 1, the combine has a chassis 10, having the usual elevator 12 to which is attached a long transverse table 14, supporting a reel 16. These parts are indicated somewhat diagrammatically and may be of conventional construction. The auger consists of two similar halves 18 and 20 each rotatably supported at its outer end in an end wall of the table and each bolted at its central end of the other auger half. Each auger half is provided at its central end with the usual retractable fingers 22, supported on a common crank shaft 24 and which serve to propel the crop from the center part of the table rearwardly into the elevator 12 through the opening 26.

Figure 3:
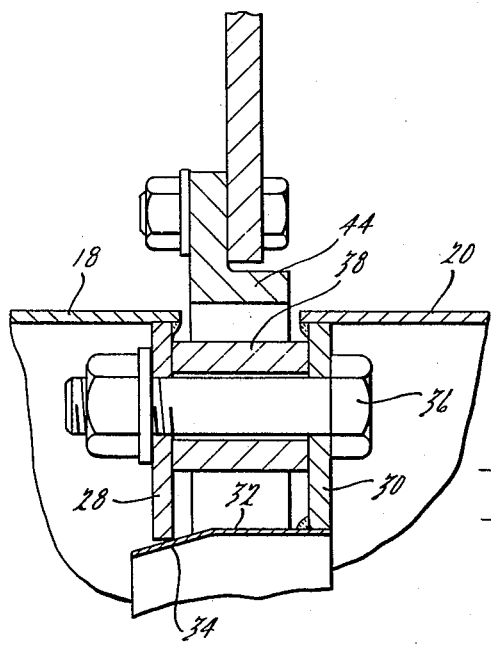
FIG. 3 is a cross-sectional view on line 3—3 of FIG. 2.
Figure 4:
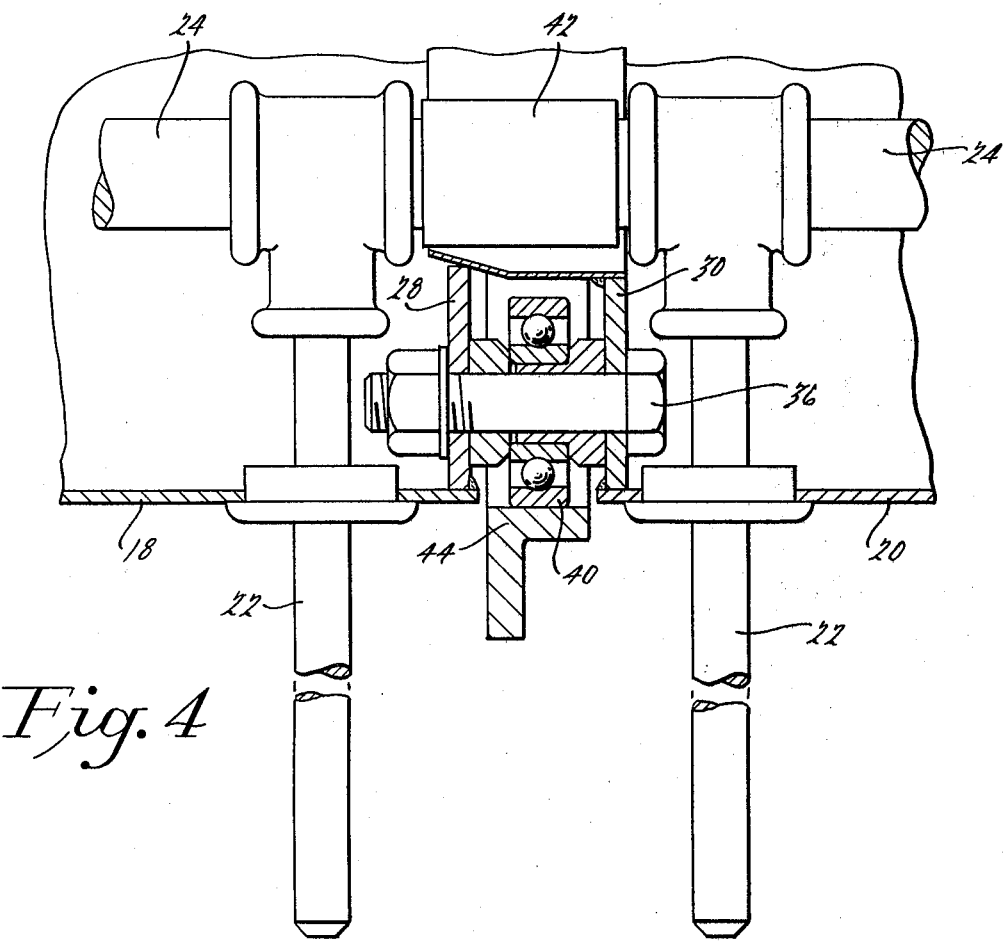
FIG. 4 is a cross-sectional view on line 4—4 of FIG. 2.

Referring to FIGS. 3 and 4, the central ends of the augers 18 and 20 have annular flanges 28 and 30 welded to them. The annular flange 30 also carries a collar 32, which serves both to form an enclosing bridge between the adjacent flanges and, because of its conical nose 34, to drive the ends of the two auger halves into coaxial relation at the time of the assembly. The plurality of bolts 36 are provided for fastening the annular flanges 28 and 30 together. In the present instance, six such bolts are used, three of them having spacers 38 positioned between the flanges (FIG. 3) and the other three carrying ball bearing rollers 40 (FIG. 4). Suitable hand holes and covers, not shown, are provided in the auger tube for access to the bolts. A coupling 42 joins the end of the two crank shafts when the two auger halves are bolted together.

For rotatably supporting the central section of the auger, there is provided a circular track or race 44 of L-shaped cross section, which is supported on an arm 46 adjustably secured to a flange 48, secured to the main frame 50 of the table.

In operation, the auger functions in the conventional manner, propelling the crop along the bottom of the table in both directions toward the center, where the retractable fingers 22 deliver the flowing stream of grain rearwardly into the elevator 12, which delivers it directly to the threshing cylinder. The circular track or race 44, being supported from the main frame 50 in the table maintains a fixed but adjustable relationship between the auger and the table preventing contact and wear between the inner portions of the auger flights and the table floor. Thus, the beam strength of each auger half need only be sufficient to give adequate auger support over a span of only half the total table length, and thus the auger may be made sufficiently light without the use of costly materials other than steel.

I claim:

1. A crop table and auger construction for combine harvesters comprising a table having bottom and back walls with end walls connecting them, an auger extending between and journaled in the end walls, a plurality of sets of retractable fingers at the mid-portion of the auger for propelling the crop off the table at the rear, means centrally and rotatably supporting the auger in spaced-relation to the table substantially mid-way between the end walls of the table, and a plurality of anti-friction rollers between the auger and the central supporting means.

2. A table and auger construction as defined in claim 1, wherein the auger comprises two sections bolted together at their middle ends.

3. A table and auger construction as defined in claim 1 wherein the rollers are mounted within the auger and the support includes a circular track around which the rollers travel.

4. A table and auger construction as defined in claim 1 wherein the supporting means includes an arm extending upwardly and rearwardly from the auger to the back wall of the table.

5. A table and auger construction as defined in claim 4 wherein the table includes a main structural beam at the top of the back wall and the support arm is attached to the beam.

* * * * *